United States Patent [19]

Montagnino et al.

[11] 4,205,561
[45] Jun. 3, 1980

[54] MULTIPLE DRIVE TRAIN FOR SMALL DEVICES

[75] Inventors: James G. Montagnino, Monroe; Harry E. Luperti, Wilton, both of Conn.

[73] Assignee: Pitney Bowes Inc., Stamford, Conn.

[21] Appl. No.: 879,371

[22] Filed: Feb. 21, 1978

[51] Int. Cl.² .............................................. F16H 3/08
[52] U.S. Cl. ........................................ 74/357; 74/359; 192/48.6
[58] Field of Search ................. 74/356, 357, 358, 359, 74/360, 665 F, 665 G, 665 GA, 701, 705, 15.2; 192/48.92, 48.6

[56] References Cited

U.S. PATENT DOCUMENTS 1,775,460  9/1930  Herrmann .......................... 74/357
3,174,349  3/1965  Renker et al. ..................... 74/359 X

FOREIGN PATENT DOCUMENTS 1375467  5/1972  United Kingdom ..................... 74/357

Primary Examiner—C. J. Husar
Assistant Examiner—Frank McKenzie
Attorney, Agent, or Firm—William D. Soltow, Jr.; Albert W. Scribner; Martin D. Wittstein

[57] ABSTRACT

This invention relates to a drive train for small devices such as postage meters and the like wherein various speeds and drives to different sets of outputs are required during different phases of operation. The drive train of the invention negates the need for a burdensome number of components through the use of a unique combination of gears and clutches.

3 Claims, 1 Drawing Figure

MULTIPLE DRIVE TRAIN FOR SMALL DEVICES

BACKGROUND OF THE INVENTION

In small devices such as postage meters and the like, it is necessary to provide the device with a plurality of components that will operate at different speeds and drive different sets of outputs during various phases of operation of of the device. Heretofore such devices have relied upon additional drive shafts, variable speed pulleys or variable speed gear transmissions in order to accomplish operation of the various functions. Using these components in such a device leads to obviously excessive size, as well as greater maintenance because of the more complex types of components. Additionally, cessation of operation may be required with prior art devices in order to obtain a change in speed.

SUMMARY OF INVENTION

It has been found that a relatively compact drive train may be provided for small devices such as postage meters and the like through the use of drive shafts and driven shafts provided with a selected assortment of clutches. The drive shaft is provided with a clutch which when engaged will drive the driven shaft at a first speed and when disengaged will drive the driven shaft at a second speed. The driven shaft is provided with gears mounted on overrunning clutches so that it is capable of being driven at one of two speeds and driving different sets of outputs depending upon only the engagement or disengagement of a single engageable type clutch with the drive shaft. The structure is such that there is no need to stop operation with the changing of gears.

BRIEF DESCRIPTION OF THE DRAWING

The single FIGURE shows a cross sectional plan view of a drive train incorporating the features of the instant invention.

DETAILED DESCRIPTION OF THE PREFERRED EMBODIMENT

Figure 1:
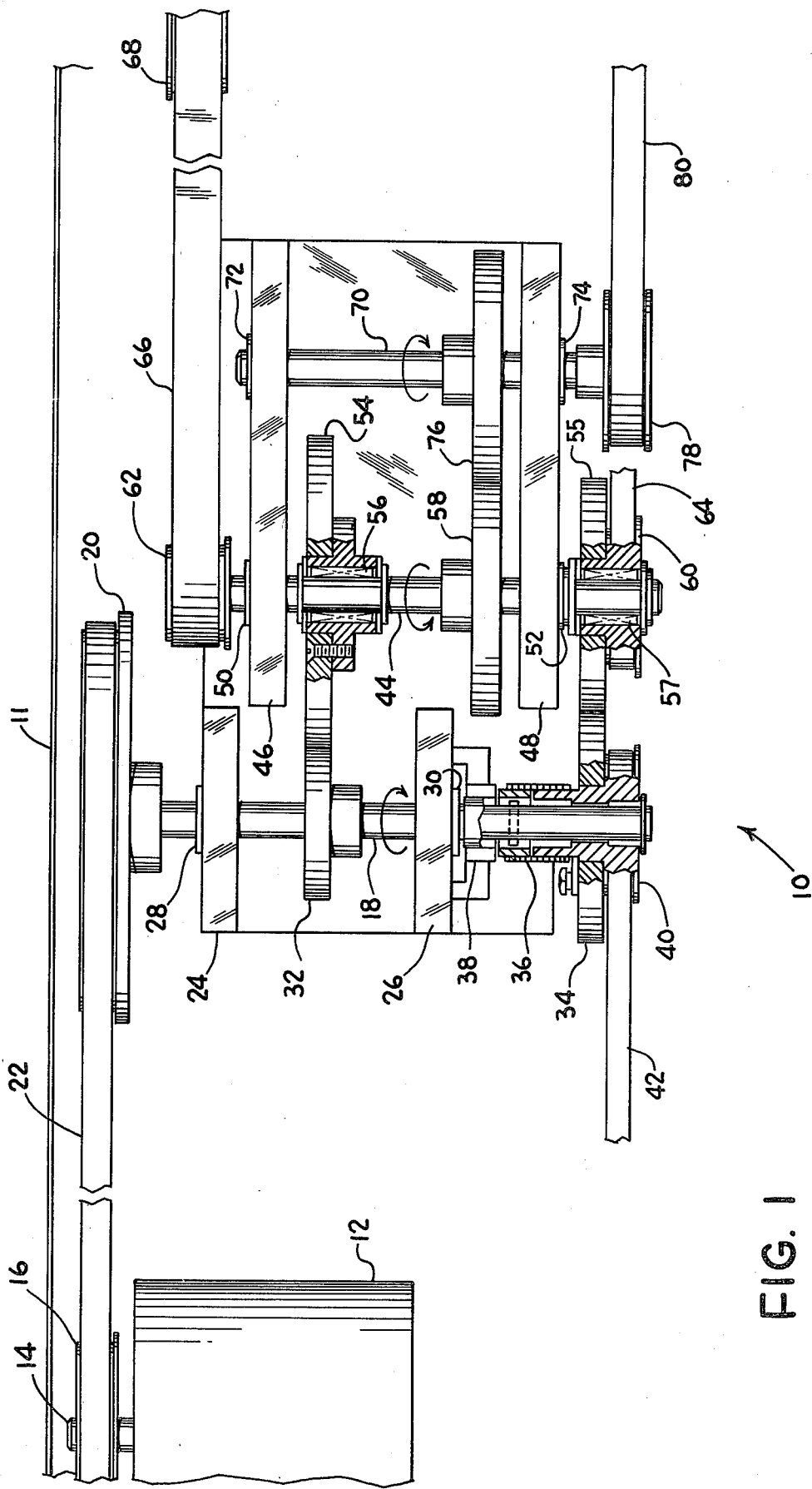

A drive train for small devices such as postage meters and the like is shown generally at 10 and is enclosed within a housing 11. A motor 12 is suitably supported within the housing 11 and to the output shaft 14 of the motor is mounted a pulley 16. A drive shaft 18 is disposed within the housing 11 and has at its outer end a pulley 20. A belt 22 is trained about the pulleys 16, 20 in order to provide drive from the motor 12 to the drive shaft 18. The drive shaft 18 is supported within the housing 11 by a pair of support walls 24 and 26, each of the walls 24, 26 having a bearing 28, 30, respectively, that receives the drive shaft 8 for rotation therein. A first gear 32 is mounted on the shaft 18 for rotation therewith and has X number of teeth. A second gear 34 having Y' number of teeth is rotatably mounted on the shaft 18, therebeing a clutch 36 mounted on the shaft to provide engagement between the shaft 18 and the gear 34. The second gear 34 has a greater number Y' of teeth than the gear 32 that has X number of teeth. A solenoid member 38 is supported by the wall 26 and is provided to actuate and disable the clutch 36. When the clutch 36 is actuated the gear 34 is in driving engagement with the shaft 18 and when the clutch is disabled the gear 34 is free running. A pulley 40 is disposed on one end of the shaft 18 and is keyed to the gear 34 for rotation therewith. A belt 42 is trained about the pulley 40 and another pulley (not shown) to drive a member such as a drive or feed roller of a postage meter machine.

A driven shaft 44 is supported within the housing 11 by a pair of support walls 46 and 48. Each of the support walls 46, 48 has a bearing member 50 and 52, respectively, therein that rotatably receives the driven shaft 44. A pair of gears 54 and 55 are disposed upon the driven shaft 44 and are in meshing engagement with the first gear 32 and the second gear 34, respectively. Overriding clutches 56 and 57 mount the gears 54,55 respectively, upon the shaft 44. One gear 54 has Z number of teeth and the other gear 55 has Y" number of teeth, the number Z being greater than the number X. Another gear 58 is mounted upon the driven shaft 44 for rotation therewith. At one end of the driven shaft 44 is a pulley 60 that is also mounted upon the overriding clutch 57 so as to be driven at the same speed as the gear 55. On the opposite end of the shaft 44, another pulley 62 is mounted for rotation therewith. A belt 64 is trained about the pulley 60 and another pulley (not shown) so as to drive a component of the device such as a stamping mechanism or an impression roller. A belt 66 is trained about the pulley 62 and another pulley 68 to drive still another component of the device such as a main drive unit which inputs rotating drive to a postage meter.

The support walls 46 and 48 support still another driven shaft 70 by receiving the same in bearings 72 and 74 mounted within the support walls 46, 48, respectively. The shaft 70 has a gear 76 mounted theron that is in meshing engagement with the gear 58. At one end of the shaft 70 is a pulley 78 having a belt 80 trained thereabout and another pulley (not shown) to provide drive for still another component of the device such as a sealing roller. It will be appreciated that the gear 58 and the shaft 70 with its supported components are optional and not necessary for carrying out the instant invention.

In operation, the motor 12 will cause drive to be transmitted to the drive shaft 18 through the belt 22 at a constant speed. Assuming that the clutch 36 is disengaged, the gear 34 will be stationary and the gear 32 will drive the gear 54 at a first speed so that the driven shafts 44 is rotated at that speed to thus drive the belts 66 and 80 at this first speed. Since the gear 54 has a greater number Z of teeth than the gear 32 which has X number of teeth, shaft 44 will rotate at a slower speed than shaft 18. At this time the shaft 44 is driving through, i.e., no drive is being transmitted, the gear 55 because of the presence of the overrunning clutch 57 and the gear 55 and pulley 60 will be stationary thereby providing no drive to the belt 64. Since the gear 34 is stationary, no drive is transmitted to the pulley 40 and the belt 42.

When it becomes necessary to drive the driven shaft 44 at a higher speed and provide drive to the belts 42 and 64, the solenoid 38 will be enabled so as to actuate the clutch and positively couple the gear 34 to the drive shaft 18. Assuming that the gear 34 has the same number Y of teeth as gear 55, i.e., Y'=Y",the drive shaft and the driven shaft 44 will be rotated at the same speed, thereby increasing the speed of rotation of the drive shaft 44. Even though the gear 32 and gear 54 are rotated at the original speed, because of the presence of the overriding clutch 56, the driven shaft 44 will drive through the gear 54 at the higher speed. The gear 58 will drive the shaft 70 at this higher speed due to the positive engagement with the gear 76. Since the gears 34 and 55 are providing drive, the pulleys 40 and 60 will be rotated to provide drive to the belts 42 and 80, respectively. Additionally, the belts 66 and 80 will be driven at a higher speed.

The invention as described heretofore will be operational so long as $$\frac{Z}{X} > \frac{Y'}{Y}.$$

As has been described a relatively simple and compact device may be provided whereby two speeds may be provided to the various units and drive to components may be inititated and terminated without the need of bulky or complicated parts without the need of interrupting drive during the change of speed.

As stated previously, the presence of shaft 70 is optional; however, it is useful when opposite rotation and variable speed is desired. The pulley 78 will rotate in a direction opposite the rotation of the pulleys 60,62 but will also have two speeds. Although a pulley could be mounted on shaft 18 to obtain the same direction of rotation as pulley 78, it would have only one speed instead of two.

We claim:

1. In a drive train for a small device such as a postage meter or the like, the combination comprising:
    a housing,
    a first shaft rotatably received within said housing,
    means for rotatably driving said first shaft,
    a first gear having X number of teeth secured to said first shaft for rotation therewith,
    a second gear having Y' number of teeth rotatably disposed upon said first shaft,
    a clutch disposed intermediate said first shaft and said second gear,
    means for enabling said clutch to couple said second gear to said first shaft,
    a second shaft rotatably received within the housing,
    a third gear mounted on said second shaft in meshing engagement with said second gear,
    an overriding clutch located intermediate said second shaft and said third gear,
    a fourth gear having Z number of teeth mounted on said second shaft in meshing engagement with said first gear of said first shaft, and
    an overriding clutch disposed between said fourth gear and said second shaft.

2. The drive train of claim 1 where Z is greater than X and said third gear has Y" number of teeth and $$\frac{Z}{X} > \frac{Y''}{Y'}.$$

3. The drive train of claim 2 including a fifth gear mounted on said second shaft and a third shaft rotatably received within said housing and having a sixth gear mounted thereon which is in meshing engagement with said fifth gear.

* * * * *

UNITED STATES PATENT AND TRADEMARK OFFICE
CERTIFICATE OF CORRECTION

PATENT NO. : 4,205,561

DATED : June 3, 1980

INVENTOR(S) : James G. Montagnino, Harry E. Luperti

It is certified that error appears in the above—identified patent and that said Letters Patent is hereby corrected as shown below:

Column 1, line 9, delete "of" (second occurrence).

Column 1, line 28, change "qears" to -- gears --.

Column 1, line 54, change "8" to -- 18 --.

Column 2, line 29, change "theron" to -- thereon --.

Column 2, line 42, change "shafts" to -- shaft --.

Column 3, line 13, change "inititiated" to -- initiated --.

Signed and Sealed this

Twenty-seventh Day of October 1981

[SEAL]

Attest:

Attesting Officer

GERALD J. MOSSINGHOFF

Commissioner of Patents and Trademarks